United States Patent [19]
Nakata et al.

[11] Patent Number: 6,009,195
[45] Date of Patent: *Dec. 28, 1999

[54] IMAGE PROCESSOR WITH MARKER EDITION MODE

[75] Inventors: Hironobu Nakata; Hiroyuki Ideyama, both of Toyokawa; Toshihisa Motosugi, Okazaki, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/662,941

[22] Filed: Jun. 12, 1996

[30] Foreign Application Priority Data

Jun. 14, 1995 [JP] Japan ..................................... 7-147312
May 30, 1996 [JP] Japan ..................................... 8-136379

[51] Int. Cl.⁶ ........................................................ G06K 9/34
[52] U.S. Cl. ........................... 382/175; 382/282; 358/453; 358/452
[58] Field of Search ................................ 382/175, 282, 382/195; 358/453, 538, 452, 448

[56] References Cited

U.S. PATENT DOCUMENTS

| | | |
|---|---|---|
| 4,908,716 | 3/1990 | Sakano ..................................... 358/453 |
| 4,953,013 | 8/1990 | Tsuji et al. ............................... 358/530 |
| 5,075,787 | 12/1991 | Shaughnessy et al. .................. 358/452 |
| 5,140,440 | 8/1992 | Sasaki ...................................... 358/453 |
| 5,272,764 | 12/1993 | Bloomberg et al. ..................... 358/453 |
| 5,416,849 | 5/1995 | Huang ...................................... 382/173 |
| 5,430,808 | 7/1995 | Baird et al. .............................. 382/176 |
| 5,548,664 | 8/1996 | Knowlton ................................. 382/174 |
| 5,572,601 | 11/1996 | Bloomberg ............................... 382/175 |
| 5,579,407 | 11/1996 | Murez ....................................... 382/164 |
| 5,608,544 | 3/1997 | Yamanishi ................................ 358/453 |

FOREIGN PATENT DOCUMENTS

| | | |
|---|---|---|
| 4-46462 | 2/1992 | Japan . |
| 4-80885 | 3/1992 | Japan . |
| 4-97262 | 3/1992 | Japan . |
| 7-131628 | 5/1995 | Japan . |

*Primary Examiner*—Jon Chang
*Attorney, Agent, or Firm*—Burns, Doane, Swecker & Mathis, LLP

[57] ABSTRACT

In marker edition mode, characters such as a character line is read in a closed area on a document marked with a marker. Then, the image data is analyzed to decide image processing means for marker edition such as coloring. A rectangular area including the image is recognized as image processing area. Even if the image is included partially in the closed area marked with a marker, a rectangular area including the image wholly can be specified as image processing area.

21 Claims, 12 Drawing Sheets

IMAGE PROCESSOR WITH MARKER EDITION MODE

BACKGROUND OF THE INVENTION

1. Field of the Invention

The present invention relates to an image processor, or in particular to an image processor having marker edition mode.

2. Description of the Prior Art

Various types of image processors have been proposed for so-called marker edition. In marker edition mode, an operator marks an area in a document with a marker, and the area is subjected to a predetermined image processing such as coloring. For example, an image processor disclosed in Japanese Patent laid open Publication No. 7-131628/1995 recognizes an area in a document enclosed with a marker as an image processing area. An apparatus disclosed in Japanese Patent laid open Publication No. 4-97262/1992 determines a rectangle which inscribes or circumscribes an area enclosed with a marker and recognizes the rectangle as an image processing area.

Image processing on an image in the image processing area is, for example, coloring, trimming or erasing. Further, in an apparatus disclosed in Japanese Patent laid open Publication No. 4-80885/1992, characters in the image processing area are recognized, and they are translated.

Figure 1A:
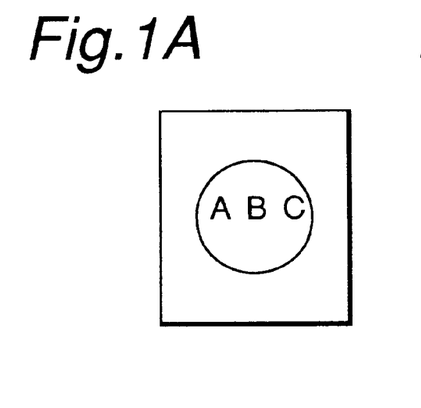
FIG. 1A is a diagram of an example of a document image.
Figure 1B:
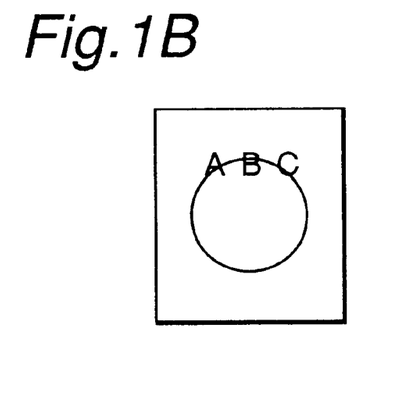
FIG. 1B is a diagram of an example of marking in the document image with a marker.
Figure 1C:
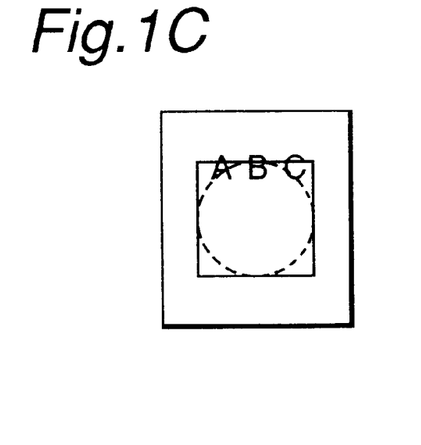
FIG. 1C is a diagram of a rectangular area determined in a prior art marker edition.
Figure 1D:
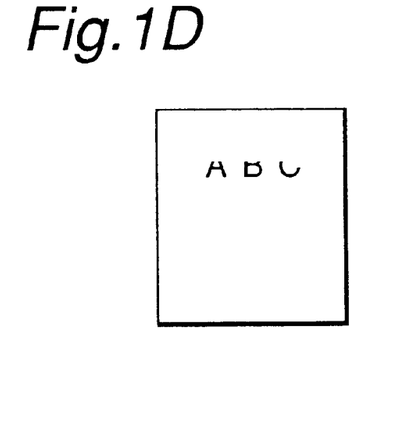
FIG. 1D is a diagram of an image subjected to trimming on the rectangular area.

However, in prior art image processors, it is troublesome for an operator to specify with a marker an image processing area which includes a desired image in a document, especially an area including a particular character or characters. For example, in the apparatus described in Japanese Patent laid open Publication No. 4-46462/1992, when an operator marks a desired area to specify a rectangular area including a character line "ABC" correctly in a document shown in FIG. 1A, it is necessary to enclose entire characters of "A", "B", "C". If the entire characters are not enclosed with a marker, as shown in FIG. 1B, a rectangular area circumscribing a closed area marked with the marker includes a part of the character line "ABC", as shown in FIG. 1C. If trimming is performed on the image in the rectangular image, only the partial image of the character line "ABC" is reproduced when an image of the document is reproduced on a paper, as shown in FIG. 1D. In the apparatus described in Japanese Patent laid open Publication No. 4-97262/1992, an operator is also required to specify an enclosed area with a marker correctly and carefully.

SUMMARY OF THE INVENTION

An object of the present invention is to provide an image processor which can specify an image processing area in a simple and correct way, especially can specify a rectangular area including characters.

In an image processor of the invention, image data is read on a document, and an image including characters is detected in a specified area in the document. Even if the image is included partially in the specified area, a rectangular area including the characters wholly is recognized as an image processing area. Beside an image existing in a closed area marked with a marker, the characters in the specified area includes, for example, characters existing on a boundary of the closed area, or characters existing on a boundary of a rectangular area circumscribing the closed area. Even if a part of the characters belongs to the closed area, the characters extending outside the closed area are recognized, and a rectangular area enclosing the image wholly can be recognized or specified simply and correctly as an image processing area. Then, an image processing is performed on the characters in the rectangular area.

An advantage of the present invention is that an image processing area on marker edition can be determined even if characters in an image are marked incompletely.

BRIEF DESCRIPTION OF THE DRAWINGS

These and other objects and features of the present invention will become clear from the following description taken in conjunction with the preferred embodiments thereof with reference to the accompanying drawings, and in which:

FIG. 8, comprising

FIG. 12, comprising

DETAILED DESCRIPTION OF THE PREFERRED EMBODIMENTS

Referring now to the drawings, wherein like reference characters designate like or corresponding parts throughout the views, FIG. 1 shows a digital color copying machine of an embodiment of the invention comprising an image reader section 100 which reads an image in a document and a copying section 200 which forms an image on a sheet of paper on the basis of the image data read by the image reader section 100.

Figure 2:
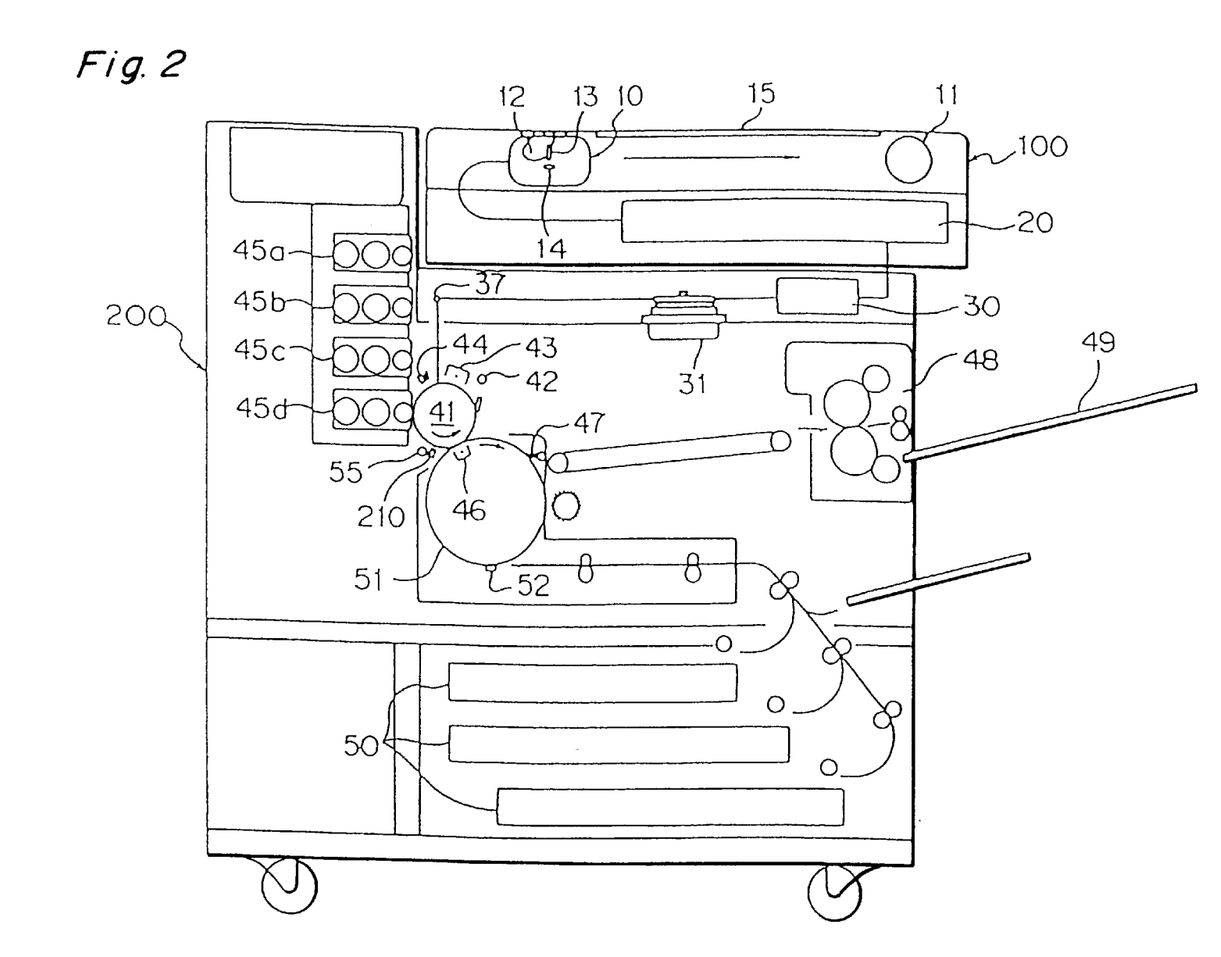
FIG. 2 is a sectional view of a digital color copying machine.

In the image reader section 100, a scanner 10 includes a lamp 12 for exposure, a rod lens array 13 condensing a light reflected by a document, and a CCD (charge-coupled device) color image sensor 14 (hereinafter referred to as image sensor) of contact type which converts the condensed light to electrical signals. When a document image is read, the scanner 10 is driven by a scan motor 11 to be moved in a direction shown with an arrow (subscan direction) to scan the document placed on a platen glass 15. A light reflected from a document face exposed by the lamp 12 is converted by the image sensor 14 to multi-level electrical signals of three colors of red (R), green (G) and blue (B). The multi-level electrical signals are converted to 8-bit gradation data. Then, they are stored in a buffer memory 30 provided for synchronization.

In the copying section 200, a printer head 31 generates signals for driving a laser diode 151 (refer to FIG. 4) on the basis of image data received from an image signal processor 20, and the laser diode 151 emits a light beam according to the driving signals. The laser beam emitted by the laser diode 151 exposes a rotating photoconductor drum 41 after reflected by a mirror 37. Before exposure in each copying operation, the photoconductor drum 41 is erased by an eraser lamp 42 and sensitized uniformly by a charger 43. Then, when the photoconductor drum 41 is exposed, an electrostatic latent image is formed on the photoconductor drum 41 in correspondence to a document image. Then, one of the development units 45a–45d of cyan (C), magenta (M), yellow (Y) and black (BK) is selected to develop the latent image with toners. A sheet of paper is fed from one of paper cassettes 50 and wound on a transfer drum 51. The toner image on the photoconductor drum 41 is transferred by a transfer charger 46 onto the sheet of paper on the transfer drum 51. This image forming process is repeated on four colors of magenta, cyan, yellow and black, while the scanner 10 repeats scan operation in synchronization with the photoconductor drum 41 and the transfer drum 51. Then, the sheet of paper is separated by a claw 47 from the transfer drum 51. Then, the toner image is fixed by a fixing device 48, and the sheet of paper is discharged to a tray 49.

Figure 3:
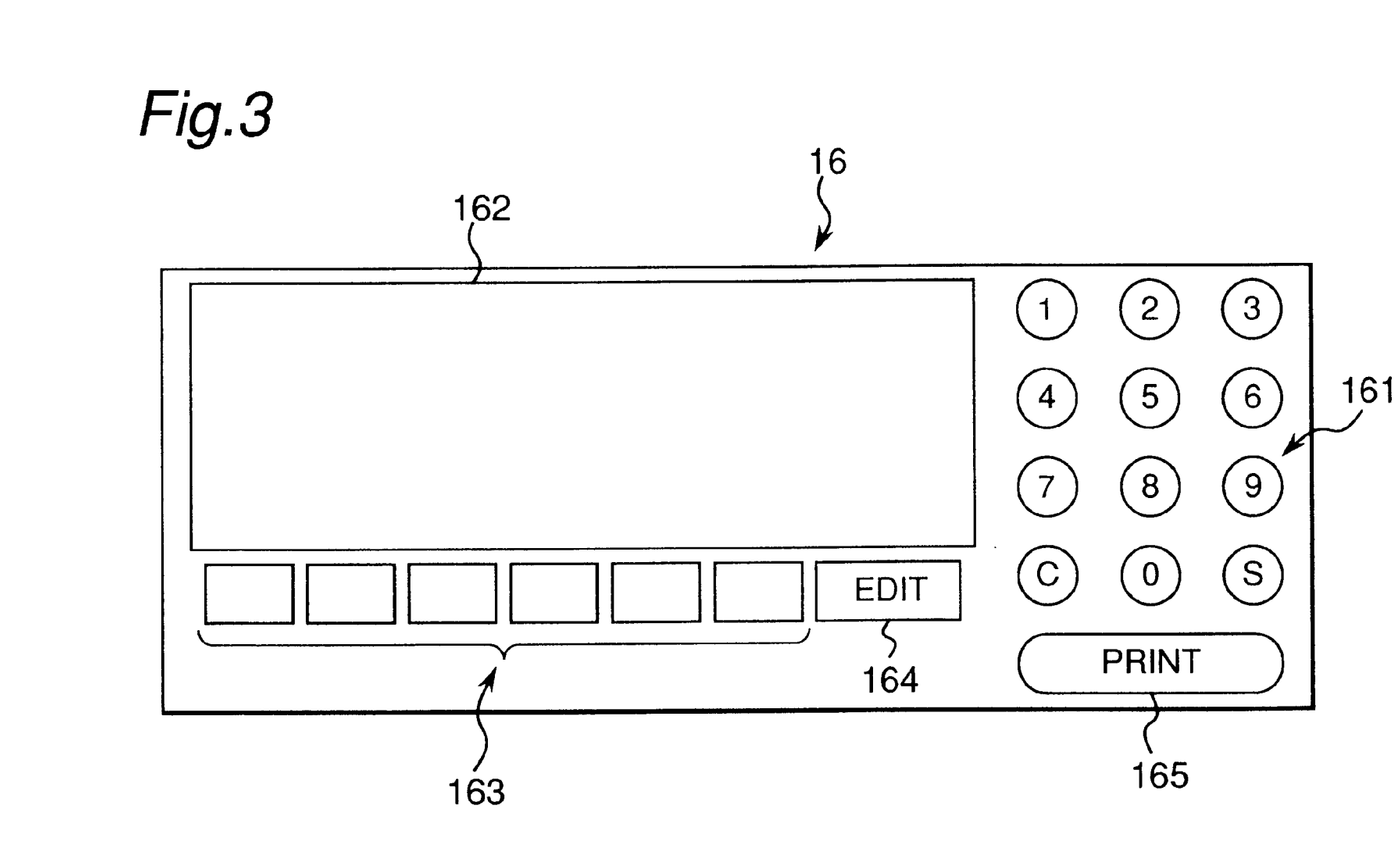
FIG. 3 is a plan view of an operational panel.

FIG. 3 shows an operational panel 16 of the copying machine. A number of copies is input with ten-keys 161. A display device 162 displays various operation modes, the number or copies or the like. A function key 163 has a function which is changed with a content displayed in the display device 162, and it is used to select and set an operation mode. An edition mode key 164 is used to set marker edition mode. In the copying machine of the embodiment, when marker edition mode is set by an operator, a rectangular area is recognized on the basis of a closed area enclosed with a marker, and coloring is performed for changing the color of a background color of a document image in the rectangular area. A print key 165 is used to start a copy operation.

Figure 4:
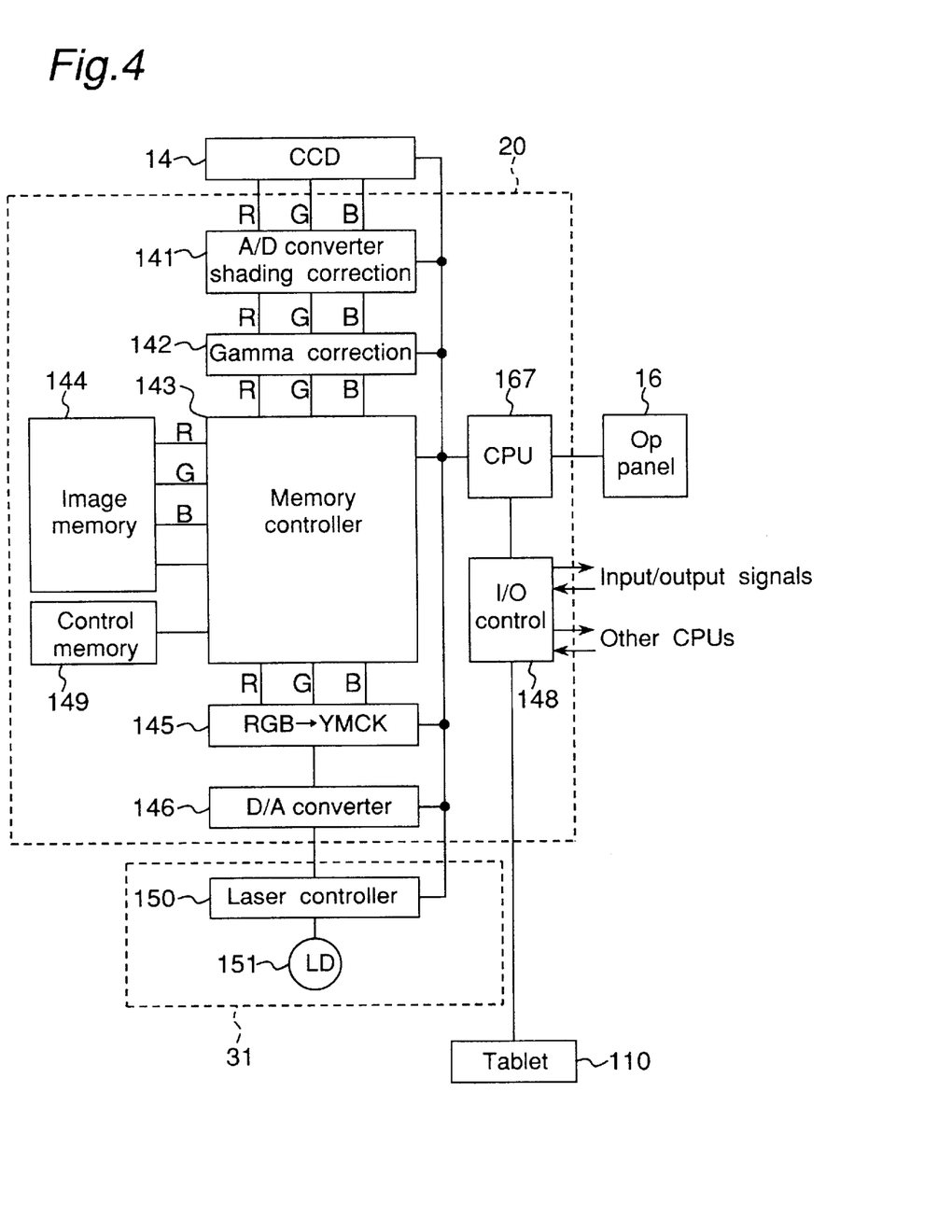
FIG. 4 is a block diagram of a control circuit of the copying machine.

FIG. 4 shows a block diagram of a control circuit of the copying machine. A preprocessor 141 in the image signal processor 20 converts image data of red, green and blue read by the image sensor 14 to digital data and performs shading correction on the digital data. Then, a gamma correction section 142 performs gradation correction on the digital data, and the data are stored in an image memory 144 by a memory controller 143.

A two-dimensional address of x and y coordinates is set in the image memory 144 in correspondence to a document. The x and y coordinates correspond to main scan direction or a direction of alignment of the image sensor 14 and subscan direction perpendicular to the main scan direction, respectively. An image data of a pixel read by the image sensor 14 is stored at an address. Each image data consists of an 8-bit area for an image data of red, green or blue (256 gradations) and an 8-bit area of attribute data which will be used in the image processing explained later. When marker edition mode is set, image processing is performed in the image memory 144. The image data after the image processing are supplied to a color conversion section 145 in synchronization with image-forming timings for each color in the copying section. The color conversion section 145 converts image data of red, green and blue read from the image memory 144 to 8-bit gradation data of magenta, cyan, yellow and black. Then, the data after color conversion are converted by a digital-to-analog converter 146 to analog signals. A laser controller 150 in the print head 31 generates a laser drive signal on the basis of the analog signal to emit a beam from the laser diode 151.

Information on copying conditions set by an operator with the operational panel 16 are stored in a control memory 149. A central processing unit (CPU) 167 reads the information stored in the control memory 149, and it performs sequence control of the image sensor 14, the image signal processor 20 and the print head 31 according to the image data. Further, other input/output control and communication with other CPUs on copying are performed through an input/output circuit 148.

Figure 6A:
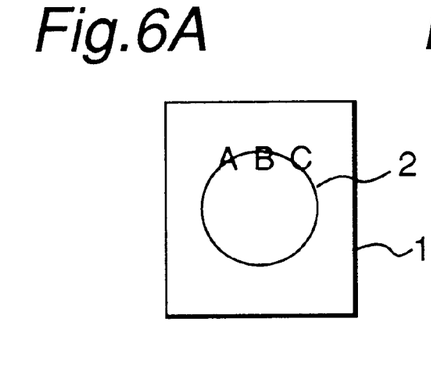
FIG. 6A is a diagram of an example of an image in a document.
Figure 6B:
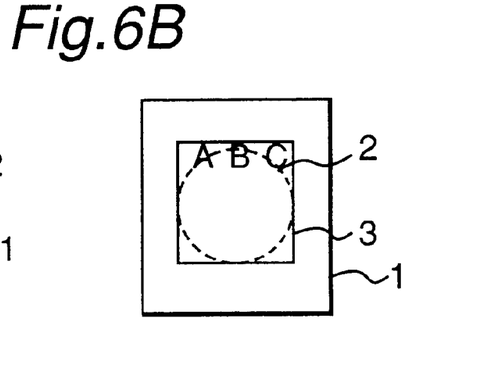
FIG. 6B is a diagram of an image processing area on the image shown in FIG. 6A.

The copying machine is connected to a tablet 110 shown in FIG. 6 as a pointing device. An operator can specify an image processing area in a document directly with a marker. However, the image processing area can also be specified on a pad 111 of the tablet 110 with a pointing pen 112 by pointing two points which determines two corners of a rectangular area. Information received from the tablet 110 is sent through the input/output control circuit 148 to the CPU 167.

Next, it is explained how an image processing area is determined. In the copying machine of this embodiment, when an operator marks a closed area with a marker, a rectangular area circumscribing the closed area is recognized as a first rectangular area. If an image including a character or a character line is enclosed in the closed area, the first rectangular area is an image processing area. If characters exist on a boundary of the first rectangular area or if a part of characters extends outside the first rectangular area, another rectangular area (hereinafter referred to as a second rectangular area) which is a minimum area including the characters wholly is recognized as an image processing area. In an example shown in FIG. 2A, even if a character line "ABC" is not enclosed wholly in a closed area marked with a marker, a rectangular area including the characters completely is recognized as an image processing area, as shown in FIG. 2B. As described above, a first rectangular area may also be specified by a pointing device such as the tablet 110 by pointing two diagonal points of the rectangular area.

In the copying machine of the embodiment, a decision whether a character exists on a boundary of a first rectangular area is based on a decision whether color pixels other then white exist on the boundary of the first rectangular area. However, a character is expressed as a bi-level image of black and white in a document. Then, if black pixels exist on a boundary of a first rectangular area, it can be decided that a character exists on the boundary. If such decision is adopted, an image processing area can be recognized correctly for a document having a background color other than white.

Figure 7:
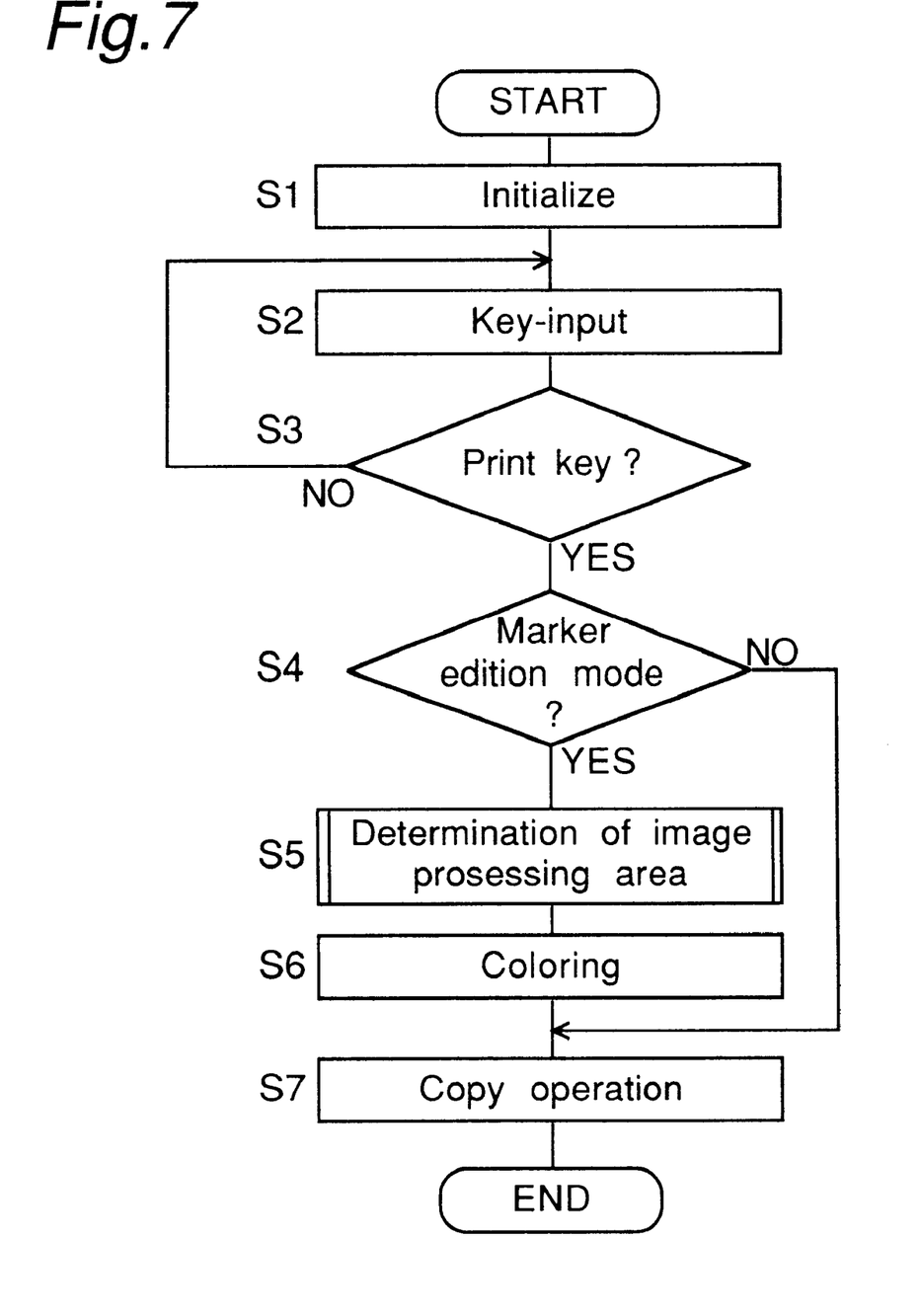
FIG. 7 is a flowchart of a main routine.

FIG. 7 shows a main routine of controlling the copying machine. After an electric power source of the copying machine is turned on, the copying machine is initialized first (step S1). Next, a key-input is received from the operational panel (step S2). If a key-input of the print key 165 is decided to be received (YES at step S3), it is decided next if marker edition mode is set or not (step S4). If marker edition mode is decided not to be set (NO st step S4), a copying operation is performed (step S7).

On the other hand, if marker edition mode is decided to be set (YES st step S4), an image processing area is specified (step S5), as will be explained later in detail. Next, image processing is performed on the image data in the image processing area determined at step S5 (step S6). The image processing performed in the embodiment is coloring which changes background color of document image in the rectangular area. However, the image processing on the rectangular area is not limited to coloring, but it may be another processing such as trimming or erasing. After the image processing is completed, a copying operation is carried out (step S7). Because marker edition mode is set, an image is formed on a sheet of paper according to image data subjected to image processing or coloring at step S6.

Figure 8A:
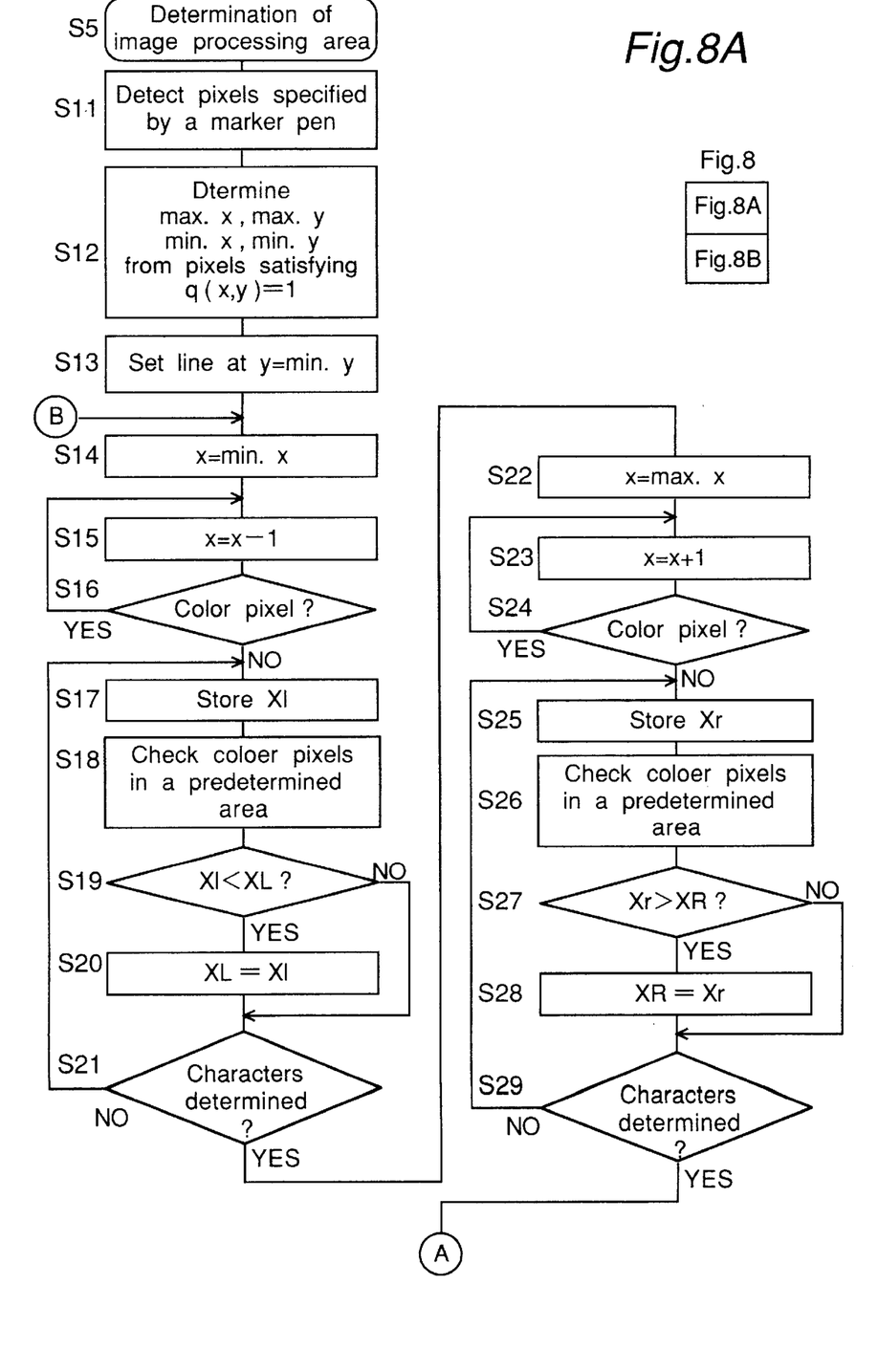
FIGS. 8A and 8B are flowcharts of specifying an image processing area in the first embodiment.
Figure 8B:
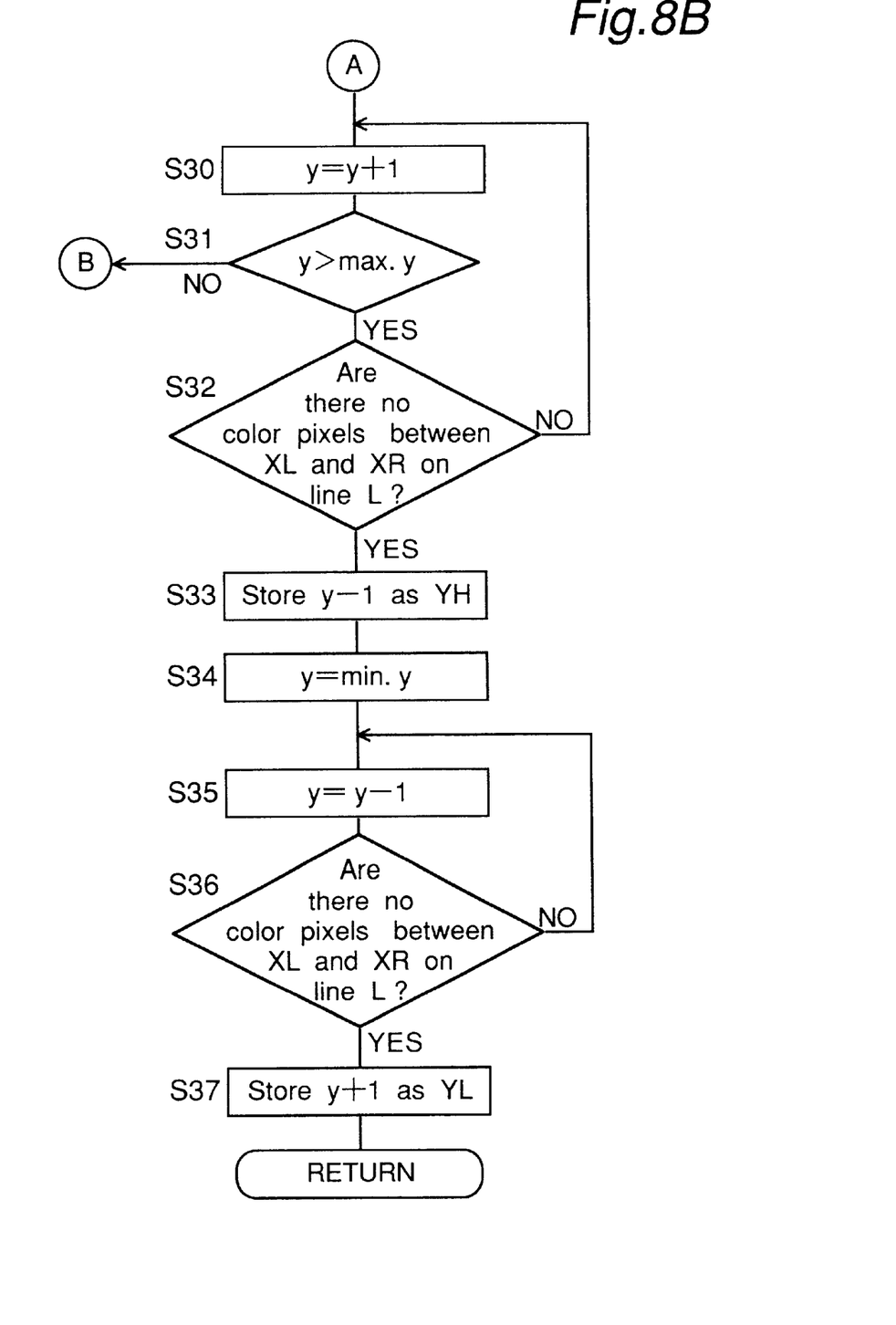
Figure 9:
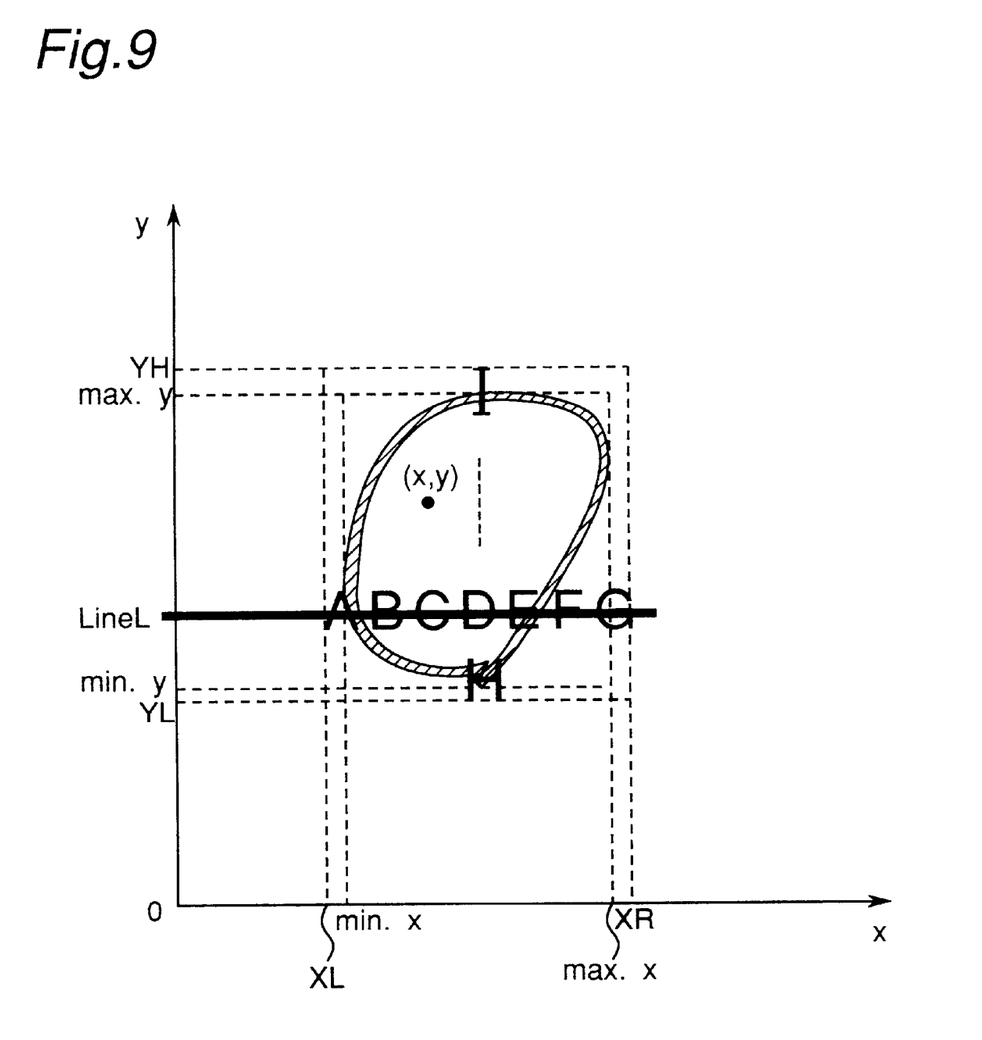
FIG. 9 is a diagram for explaining an image processing area recognized with reference to a mark and characters in a document.

FIGS. 8A and 8B show a flowchart of specification of image processing area (step S5 in FIG. 7). FIG. 9 illustrates various quantities on an image processing area (marker area) recognized according to a mark and an image in a document. As shown in FIG. 9, image data are handled as a collection of pixels arranged in two dimensions represented as x and y coordinates. A point (x, y) corresponds to a pixel. In an example shown in FIG. 9, an area marked by an operator with a marker is expressed as a hatched area. A first rectangular area circumscribing the marked area (hatched area) is defined by four points (min.x, min.y), (max.x, min.y), (min.x, max.y) and (max.x, max.y), wherein min.x and max.x are a minimum and a maximum of x coordinate in the marked area and min.y and max.y are a minimum and a maximum of y coordinate in the marked area. In this example, a character or characters to be subjected to image processing are not included completely in a closed area marked in a document. In the specification of image processing area, though a part of the character or characters belongs to the closed area, a rectangular area including the character or characters completely can be specified simply and correctly. In the example shown in FIG. 9, parts of characters "A", "H", "C" and "I" exist on the sides defining the first rectangular area. Then, a second rectangular area including these characters completely has to be determined. Then, most left, most right, lowest and highest points of these characters on the boundary of the first rectangular area define the second rectangular area or an image processing area. That is, the image processing area is defined as an area defined by four points (XL, YL), (XR, YL), (XL, YH) and (XR, YH) wherein XL and XH are a minimum and a maximum of x coordinate and YL and YH are a minimum and a maximum of y coordinate in the image included partially or wholly in the first rectangular image.

Next, the specification of image processing area is explained according to the flowchart shown in FIGS. 8A and 8B with reference to FIG. 9. In the specification processing, a first rectangular area is determined first (steps S11–S12). Next, in order to determine a second rectangular area, XL and XR are obtained by scanning data at y coordinates between max.y and min.y from below to above (steps S13–S29), where XL is obtained by decreasing x coordinate from min.x and XR is obtained by increasing x coordinate from max.x for each line. Next, YH is obtained by scanning data in a region at y coordinate above max.y for each line successively to detect a color pixel between a range from XL to XR (steps S30–S33). Similarly, YL is obtained by scanning data in a region at y coordinate below min.y for each line successively to detect a color pixel between the range from XL to XR (steps S34–S37). Thus, four values of XL, XR, YL and YR are determined. The second rectangular area is determined on the basis of XL, XR, YL and YR.

In detail, an operator selects marker edition mode by pressing the mode key 163 and the enter key 164 in the operational panel 16 and encloses an area for edition in a document with a marker. Then, the document is placed on the platen glass 11, and the print button 165 is pushed. The image data of the document is stored in the image memory 144. As to the image data stored in the image memory 144, pixels marked with a marker are detected in the document image (step S11). They are detected by detecting pixels having a particular color in correspondence to the color of the marker. Next, as to the pixels (x, y) marked with the marker, the first bit of an attribute data of the pixels is set at "1", otherwise it is set at "0". The value of the first bit of the attribute data of a pixel (x, y) is hereinafter referred to as q(x, y). Next, maxima, max.x and max.y, and minima, min.x and min.y, of x and y coordinates are determined on pixels of q(x, y)=1 stored in the image memory 144(step S12). Thus, the first rectangular area is determined.

Next, a second rectangular area is determined. Each point defining the second rectangular area is determined on the data of pixels by scanning them successively in the unit of a line L in parallel to y axis. First, in order to check a region lower than the first rectangular area, a value of a of y coordinate as a pointer for specifying a line L is set the minimum min.y of the first rectangular area (step S13). Next, in order to check a left side of the first rectangular area, a value of x coordinate in the line L is set at the minimum, min.x, of the first rectangular area, and a value of XL for defining the second rectangular area is also set at min.x (step S14). Next, a value of x coordinate is updated by decreasing it by one (step S15), and it is decided if a pixel at a point (x, y) is a color pixel or not (step S16). In this embodiment, the decision if the pixel is a color pixel or not is performed by deciding if the image data of red, green and blue at the point are all equal to or larger than a predetermined value (say 230 when 255 is the maximum value or brightest pixel) or the pixel can be regarded as a white pixel. If the pixel at the point (x, y) is decided to be a color pixel (YES at step S16), the flow returns to step S15 in order to check on another pixel at a point which exists at a more left point. If the pixel at the point (x, y) is decided not to be a color pixel (NO at step S16), the current value of x coordinate which represent the most left position of the image is stored as Xl in a memory (step S17). Next, in order to check an end of a character line, it is decided if there exists a color pixel (or a different character) again in a range from XL to (XL–TH1) wherein TH1 is a threshold value (step S18). The threshold value TH1 corresponds to a value of separation between two characters arranged in x-axis direction, and it is used to check an end of a character line. If it is decided that there exists a color pixel in the range, the value of x coordinate of the color pixel is set as Xl. If Xl is decided to be smaller than XL (YES at step S19), that is, if there exists a color pixel outside XL, XL is updated at Xl (step S20). If it is decided that there exists a color pixel in the above-mentioned range (NO at step S21), the flow returns to step S17, and the current value of x coordinate is set at Xl to find a color pixel at a more left range. On the other hand, if it is decided that there exists no color pixel in the above-mentioned range (YES at step S21), the position of the pixel is confirmed as an end of the character line marked with a marker, and the flow proceeds to step S21.

Next, in order to check a right side of the first rectangular area, a value of x coordinate in the line L is set at the maximum, max.x, of the first rectangular area, and a value of XR for defining the second rectangular area is also set at max.x (step S22). Next, a value of x coordinate is updated by increasing it by one (step S23), and it is decided if a pixel at a point (x, y) is a color pixel or not (step S24). The decision is performed by deciding if the image data of red, green and blue at the point are all equal to or larger than a predetermined value. If the pixel at the point (x, y) is decided to be a color pixel (YES at step S24), the flow returns to step S23 in order to check on a pixel at a point which exists at a more right point. If the pixel at the point (x, y) is decided not to be a color pixel (NO at step S24), the current value of x coordinate which represent the most right position of the image is stored as Xr in the memory (step S25). Next, in order to check an end of a character line, it is checked if there exists a color pixel (or a different character) again in a range from XR to (XR−TH2) wherein TH2 is a threshold value (step S18). The threshold value TH2 corresponds to a value of separation between two characters arranged in x-axis direction, and it is used to check an end of a character line. If it is decided that there exists a color pixel in the range, the value of x coordinate of the color pixel is set as Xr. If Xr is decided to be smaller than XR (YES at step S27), that is, if there exists a color pixel outside XR, XR is updated at Xr (step X28). If it is decided that there exists a color pixel in the above-mentioned range (NO at step S29), the flow returns to step S25, and the current value of x coordinate is set at Xr to find a color pixel at a righter range. On the other hand, if it is decided that there exists no color pixel in the above-mentioned range (YES at step S29), the position of the pixel is confirmed as an end of the character line marked with a marker, and the flow proceeds to step S30.

Next, a new line L is set by adding one to the value of y coordinate (step S30). If the y coordinate is decided not to be larger than the maximum max.y (NO at step S31), the flow returns to step S14 to check on a line L defined by the y coordinate to determine the maximum Xr and the minimum Xl. Then, they are compared with XR and XL. If Xr or Xl is outside XR or XL, XR or XL is updated.

If the y coordinate is decided not to be larger than the maximum max.y (NO at step S31), that is, if the line L is above the first rectangular area, it is checked if there is a color pixel in the range between XL and XR which have been determined above (step S32). If there is found a color pixel (NO at step S32), the flow returns to step S30, and the y coordinate is incremented to check an upper line. Thus, it is checked successively for each line if there is a color pixel in the range between XL and XR or not. If it is decided there is no color pixel in the range (YES at step S32), it is decided that an end of the character line is found, and (y−1) is stored and confirmed as the upper limit YH (step S33).

Similarly, lines of y coordinate below min.y are checked. First, y coordinate is set at min.y (step S34). Next, the y coordinate is decremented by one (step S35), and it is checked if there is a color pixel in the range between XL and XR (step S36). If there is found a color pixel (NO at step S36), the flow returns to step S35, and the y coordinate is incremented further to check a lower line. Thus, it is checked successively for each line if there is a color pixel in the range between XL and XR. If it is decided there is no color pixel in the range (YES at step S36), it is decided that an end of the character line is found, and (y+1) is stored and confirmed as the lower limit YL (step S37).

Figures 10A, 10B:
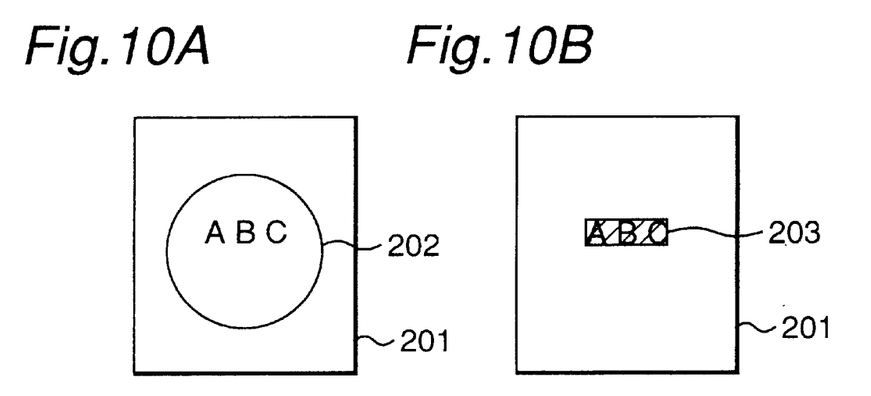
FIG. 10A is a diagram of an example of marking of a document image.
FIG. 10B is a diagram of an image processing area for explaining image processing area specified in a second embodiment.
Figures 11A, 11B:
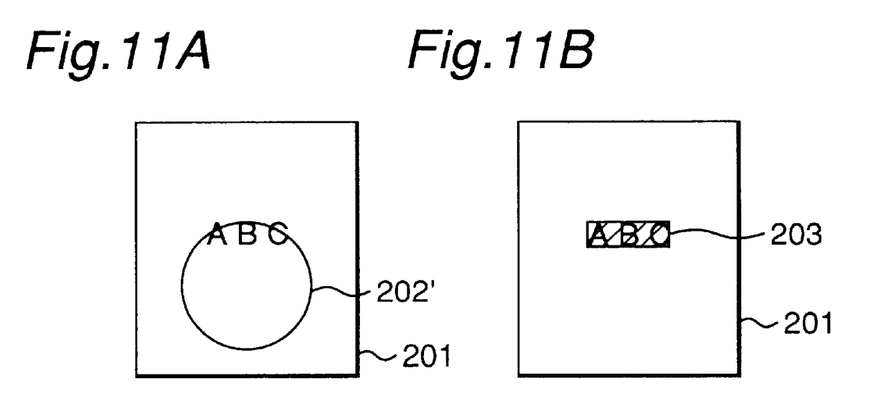
FIG. 11A is a diagram of another example of a marking of document image.
FIG. 11B is a diagram of an image processing area for explaining image processing area specified in the second embodiment.

Next, a second embodiment of the specification of image processing area (step S5 in FIG. 7) is explained. The specification processing is explained with reference to FIGS. 10 and 11. As in an example shown in FIG. 10A, if a character line "ABC" in a document 201 is enclosed completely by a line 202 with a marker, the character line is detected in a closed area inside the line 202. Then, a rectangular area 203 circumscribing the characters is set as an image processing area. On the other hand, as shown in FIG. 11A, even if a part of a character line "ABC" in a document 201 is not enclosed completely by a line 202', a rectangular area 203 enclosing the characters is set correctly as an image processing area.

Figure 12A:
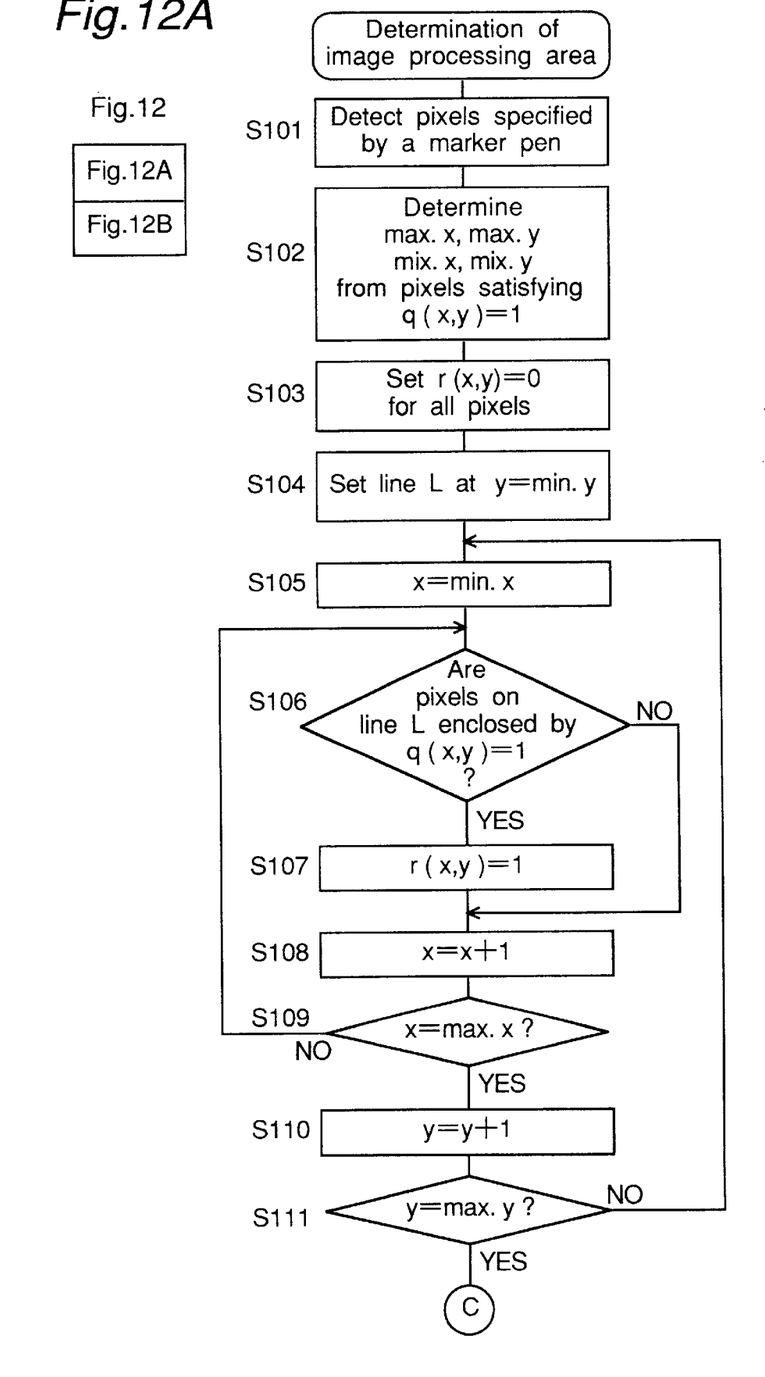
FIGS. 12A and 12B are flowcharts of specifying an image processing area in the second embodiment.
Figure 12B:
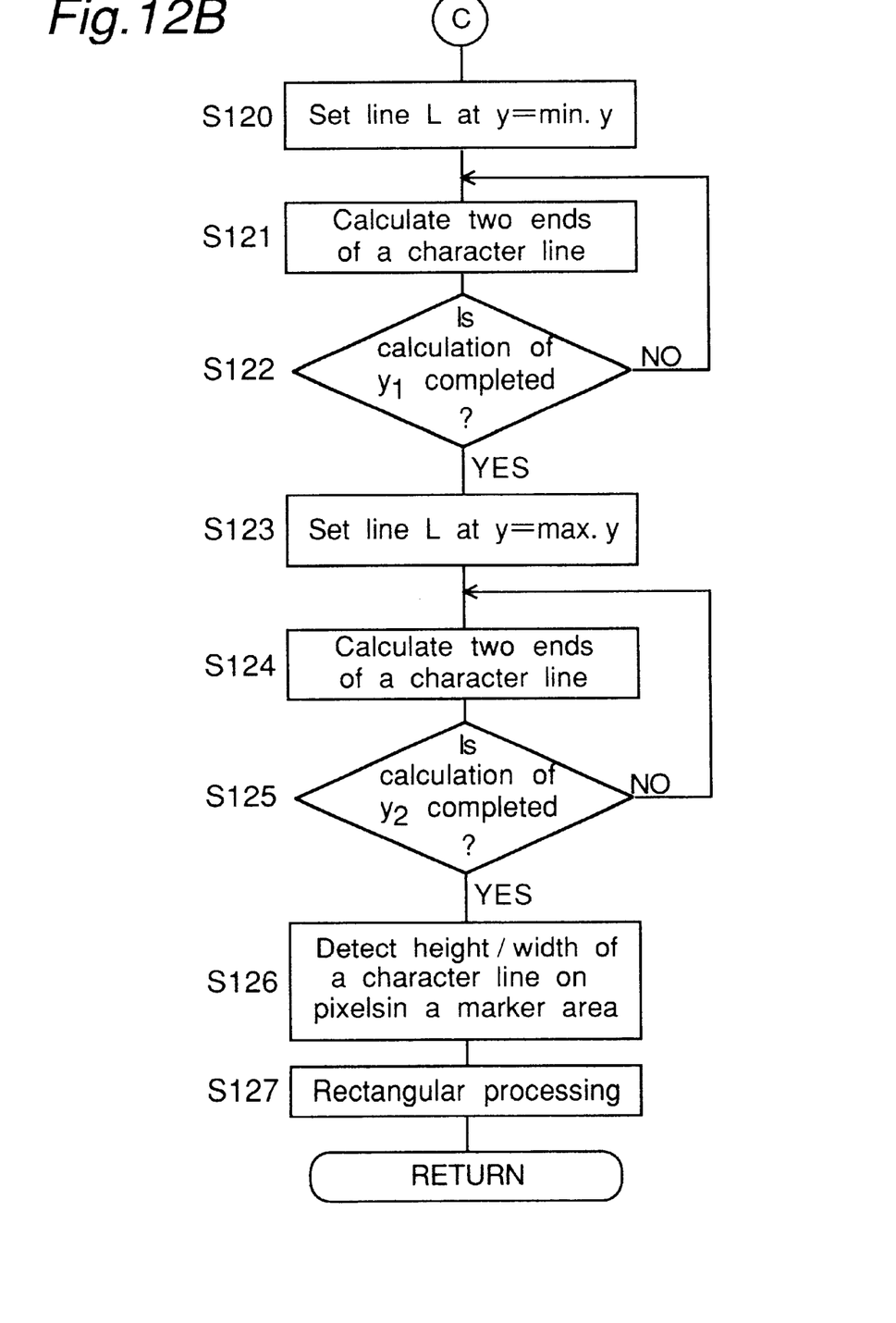

FIGS. 12A and 12B show a flowchart of the specification of image processing area (step S5 in FIG. 7). The specification thereof is performed in the following order: (1) Detection of a character line in a marker area, (2) detection of height and width of the character line, and (3) rectangular processing of the area of the character line.

First, detection of character line in a marker area is explained. An operator selects marker edition mode by pressing the mode key 163 and the enter key 164 in the operational panel 16 and encloses an area for edition in a document with a marker. The document is placed on the platen glass 11, and the print button 165 is pushed. Then, the image data of the document is stored in the image memory 144. As to the image data stored in the image memory 144, pixels marked with a marker are detected in the document image (step S101). They are detected by detecting pixels having a particular color in correspondence to the color of the marker. Next, as to the pixels (x, y) marked with the marker, the first bit of an attribute data of the pixels is set at "1", otherwise it is set at "0". The value of the first bit of the attribute data of a pixel (x, y) is hereinafter referred to as q(x, y).

Next, pixels in a closed area marked with a marker (or marker area) are detected. In concrete, first, maxima and minima (min.x, min.y, max.x and max.y) of x and y coordinates (address in the image memory 144) are determined among the pixels having q(x, y)=1 (step S102). Then, the second bit of the attribute data is set at "0" for all the points (x, y). The value of the second bit of the attribute data of a pixel (x, y) is hereinafter referred to as r(x, y). Next, a pointer y which represents a line L in parallel to x axis is set at the minimum, min.y, determined at step S102 (Step S104). Next, a value x which represents a pixel in the line L is set at the minimum, min.x, determined at step S102 (step S105). Then, it is checked if a pixel (x, y) in the line L is surrounded by pixels of q(x, y)=1 (step S106) or it is located in a marker area. If the pixel (x, y) in the line L is decided to be surrounded by pixels of q(x, y)=1, the second bit r(x, y) of the attribute data is set at "1" (step S107). Next, x coordinate is incremented by one (step S108) to specify a next pixel, and processing of steps S106–S107 is repeated. This processing is repeated by increasing x coordinate successively until the value of x reaches the maximum, max.x, determined at step S102 (YES at step S109). Thus, the second bit of the attribute data is set at "1" for all the pixels in the line L in the closed area marked with the marker. Further, y coordinate is incremented by one (step S110) to update the pointer which represents the line L. This processing is repeated until the line L reaches the maximum max.y (YES at step S111), so that the second bit of the attribute data is set at "1" for all the pixels in the closed area marked with the marker.

After a closed area (referred also to as marker area) marked with the marker is detected, an image (a character or a character line) in a document which exist within the marker area (and on the line marked with the marker) are detected. First, the line L is set at the minimum min.y of y coordinate of the pixels of q(x, y)=1 (step S120). Pixels other than white pixels are denoted as t(x, y) among the pixels other than those of q(x, y)=1. The white pixel means a pixel on which no image is written in the document. It is determined as a pixel having values of red, green and blue all exceeding a threshold value (say 230 for 256 gradation), and it may be said as a white or whitish pixel having a density smaller than a predetermined value. Next, in order to check an image at a left side of the marker area, first, a minimum $x_1$ and a maximum $x_2$ are determined among the pixels of q(x, y)=1 in the line L (step S121), and x coordinate is set at $x_1$. Then, a value of x coordinate is decremented by one, and if there is a pixel other than those of t(x, y)=1 or a pixel other than white, the x coordinate of the pixel is set as $x_1$. If it is checked there is no pixel of t (x, y)=1 in a range between $x_1$ and $x_1-k_0$, $x_1$ is stored in the memory. The value $k_0$ is a threshold value to determine a character line which can be set at an appropriate value to detect a character line. On the other hand, if it is decided that there is a pixel of t (x, y)=1 (or a color pixel outside the marker area) in the range, the x coordinate of the pixel is set as $x_1$. This processing is repeated until no color pixel is detected. Thus, a right end $x_1$ of the image is determined. Further, in order to check an image at a right side of the marker area, x coordinate is set at the maximum $x_2$. Then, pixels at a left side is checked. This processing is repeated until $x_2$ is determined, similarly to in the processing to determine $x_1$. Thus, the minimum $x_1$ and the maximum $x_2$ of the character image are determined, and they are set as $x_1'$ and $x_2'$. Further, the y coordinate at which a color pixel is detected is set as $y_1$.

Next, the y coordinate of the line L is decremented by one, and the calculation of $x_1$ and $x_2$ at step S121 is repeated. This processing is repeated until no pixel of t(x, y) is detected (step S122). In the processing, if the value of $x_1'$ or $x_2'$ calculated after decrement of y coordinate of line L satisfies a relation, $$x_1' \leq x_1,$$

or $$x_2' \leq x_2,$$

$x_1'$ or $x_2'$ is updated as $x_1$ or $x_2$. Further, the final value $y_1$ of y coordinate of the line L is stored.

After $x_1$ and $x_2$ below the marker area are calculated, the line L is set at y coordinate of max.y (step S123), and $x_1$ and $x_2$ are calculated similarly above the marker area by incrementing y coordinate by one (step S124). This processing is repeated by incrementing y coordinate successively until no pixel of t(x, y)=1 is detected (step S125). Further, the final value $y_2$ of y coordinate of the line L is stored.

Next, if there is no color pixel at the right, left, upper or lower side of the marker area, a character or a character line is detected on pixels between $x_1$ and $x_2$, and a height and a width of the character or the character line are detected (step S126). If there is no color pixel below the marker area, y coordinate of line L is set at min.y, and a color pixel is detected by moving the line L upward. Until a color pixel is determined, $y_1$ is updated at y coordinate of line L. (Similarly, if there is no color pixel above the marker area, y coordinate of line L is set at max.y, and a color pixel is detected by moving the line L downward. Until a color pixel is determined, $y_2$ is updated at y coordinate of line L.) For each line L, if there is no color pixel at the right side of the marker area, x coordinate of line L is set at $x_1$, and a color pixel is detected by incrementing x coordinate successively. Further, if there is no color pixel at the left side of the marker area, x coordinate of line L is set at $x_2$, and a color pixel is detected by decrement in x coordinate successively. If it is found that no color pixel exist in line L again, the value $y_2$ is updated as the current value of y coordinate. Thus, minima $x_1$ and $y_1$ and maxima $x_2$ and $y_2$ of x and y coordinates are determined to define an area in which a character or character line exists.

Next, a rectangular area including a character or character line is determined as an image processing area (step S127). That is, a rectangular area defined by four points $(x_1, y_1)$, $(x_1, y_2)$, $(x_2, y_1)$ and $(x_2, y_2)$ obtained at steps S120–S126 is determined as an image processing area.

As explained above, in the first and second embodiment, when a part of a character or a character line is included in a closed area marked by a marker, a rectangular area including the character or character line wholly can be specified as an image processing area subjected to marker edition processing such as trimming. That is, even if an operator encloses a character or a character line incompletely with a marker, a rectangular area including the character or character line wholly can be specified simply and correctly as an image processing area. Therefore, in marker edition mode, an operator is not needed to mark a character line to be processed correctly, and marker edition can be performed more simply. As explained above, in the first embodiment, a second rectangular area circumscribing a first rectangular area which circumscribing a closed area marked with a marker is recognized, while in the second embodiment, a rectangular area including a character or a character line is recognized. It is preferable that either of the processing of the first and second embodiments can be selected according to a type of edition. Though the number of area marked with a marker is one in the above-mentioned embodiments, it is not limited to one, but may be two or more. The specification of image processing area explained above can be modified easily in such cases. Further, the type of the marker edition processing may be different among a plurality of image processing areas.

Figure 5:
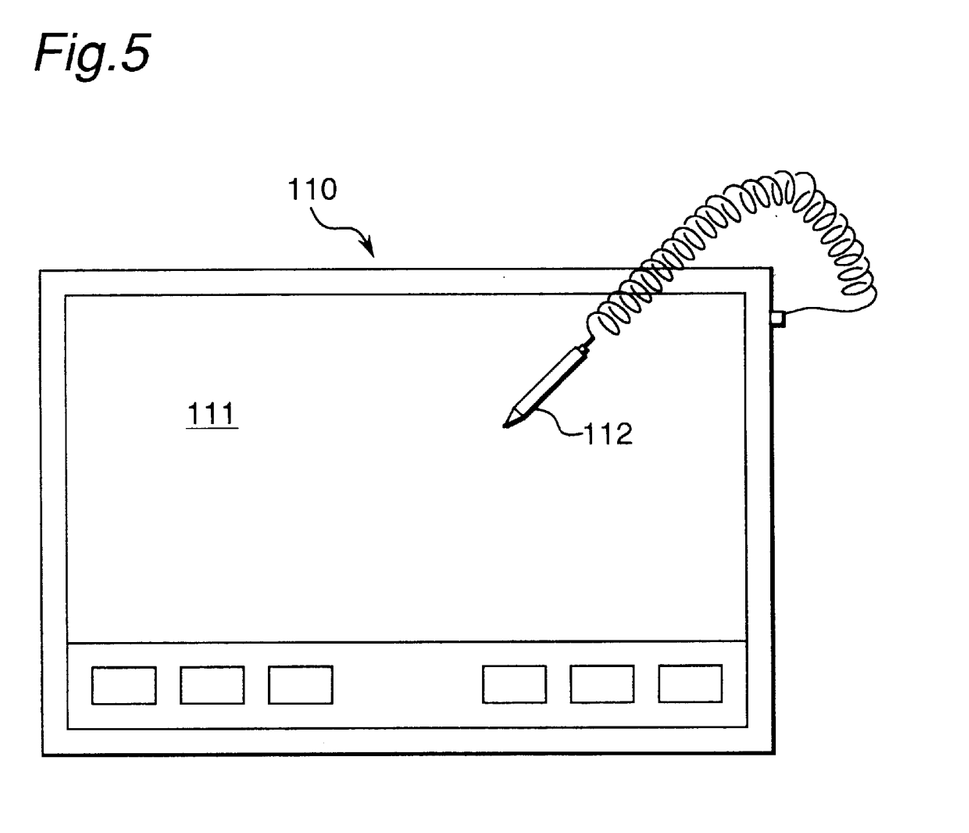
FIG. 5 is a plan view of a tablet.

In the embodiments explained above, an image processing area is specified with a marker. However, a pointing device such as a tablet 110 shown in FIG. 5 may be used instead of the marker. When the tablet 110 is used, steps S11 and S12 shown in FIG. 8A and steps S101 and S102 shown in FIG. 12A are changed. Instead of marking a document with a marker, an operator touches two points with a pointing pen 112 on the document placed on a pad ill of the tablet 110, to determine a first rectangular area. In this case, instead of the processing at steps S11 and S12 shown in FIG. 8A and at steps S101 and S102 shown in FIG. 11A, maxima, max.x and max.y, and minima, min.x and min.y, of x and y coordinates of the first rectangular area are determined according to two points in the pad 111 touched with the pointing pen 112. Then, the processing after step S13 or S103 is continued.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:

an image read means for reading image data from an image including characters on a document; and an area determining means, on the basis of image data read by said image read means, for determining a first rectangular area circumscribing a closed area in the document marked with a marker, for detecting characters existing on a boundary of the first rectangular area, and for determining a second rectangular area wholly including the detected characters.

2. The image processor according to claim 1, further comprising image processing means for performing an image processing on the image data in the second rectangular area determined by said area determining means.

3. The image processor according to claim 1, wherein said characters comprise a character line.

4. The image processor according to claim 1, wherein said area determining means determines said second rectangular area by expanding said first rectangular area such that none of its sides intersect with any characters.

5. An image processor comprising:
an image read means for reading image data from an image including characters on a document: and
an area determining means, on the basis of image data read by said image read means, for detecting characters existing in a closed area marked with a marker on the document and characters existing on a boundary of the closed area, and for determining a rectangular area wholly including the detected characters.

6. The image processor according to claim 5, further comprising image processing means for performing an image processing on the image data in the rectangular area determined by said area determining means.

7. The image processor according to claim 5, wherein said characters comprise a character line.

8. An image processor comprising:
image read means for reading image data from an image including characters in a document;
a character detection means, on the basis of image data read by said image read means, for determining a first rectangular area circumscribing a closed area in the document marked with a marker and for detecting characters existing on a boundary of the first rectangular area; and
an image processing area determining means for determining a second rectangular area wholly including the characters detected by said character detection means as an image processing area.

9. The image processor according to claim 8, further comprising image processing means for performing an image processing on the image data in the image processing area determined by said image processing area determining means.

10. The image processor according to claim 8, wherein said characters comprise a character line.

11. The image processor according to claim 8, wherein said image processing area determining means determines said second rectangular area by expanding said first rectangular area such that none of its sides intersect with any characters.

12. An image processor comprising:
image read means for reading image data from an image including characters in a document;
a character detection means, on the basis of image data read by said image read means, for detecting characters existing in a closed area marked with a marker on the document and characters existing on a boundary of the closed area; and
an image processing area determining means for determining a rectangular area wholly including the characters detected by said character detection means as an image processing area.

13. The image processor according to claim 12, further comprising image processing means for performing an image processing on the image data in the image processing area determined by said image processing area determining means.

14. The image processor according to claim 12, wherein said characters comprise a character line.

15. A method of processing image including characters, comprising:
(a) reading image data from an image including characters in a document;
(b) on the basis of image data read at the step (a), determining a first rectangular area circumscribing a closed area in the document marked with a marker and detecting characters existing on a boundary of the first rectangular area; and
(c) determining a second rectangular area wholly including the characters detected at the step (b).

16. The method according to claim 15, further comprising the step (d) of performing an image processing on image data in the second rectangular area determined at the step (c).

17. The method according to claim 15, wherein the characters detected at the step (b) comprise a character line.

18. The method according to claim 15, wherein said step (c) comprises the step of determining the second rectangular area by expanding said first rectangular area such that none of its sides intersect with any characters.

19. A method of processing image including characters, comprising:
(a) reading image data from an image including characters in a document;
(b) on the basis of image data read at the step (a), detecting characters existing in a closed area marked with a marker on the document and characters existing on a boundary of the closed area; and
(c) determining a rectangular area wholly including the characters detected at the step (b).

20. The method according to claim 19, further comprising the step (d) of performing an image processing on image data in the rectangular area determined by the step (c).

21. The method according to claim 19, wherein the characters detected at the step (b) comprise a character line.

* * * * *